Feb. 22, 1944.   J. E. FOERCH ET AL   2,342,261
ART OF FORMING BELTING
Original Filed April 15, 1941   2 Sheets-Sheet 2
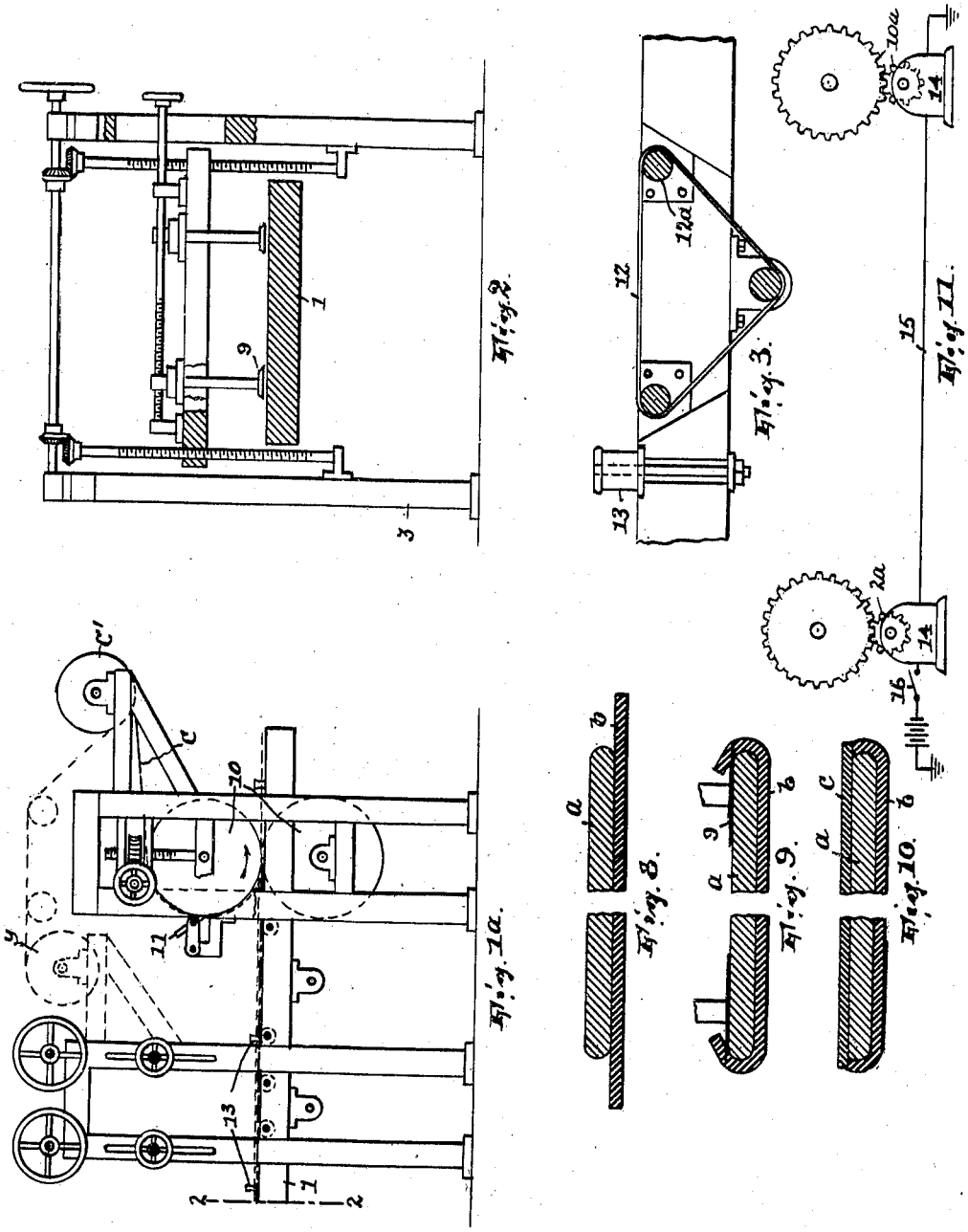
INVENTORS,
John E. Foerch and
Raymond Foerch
BY John W. Steward
ATTORNEY.

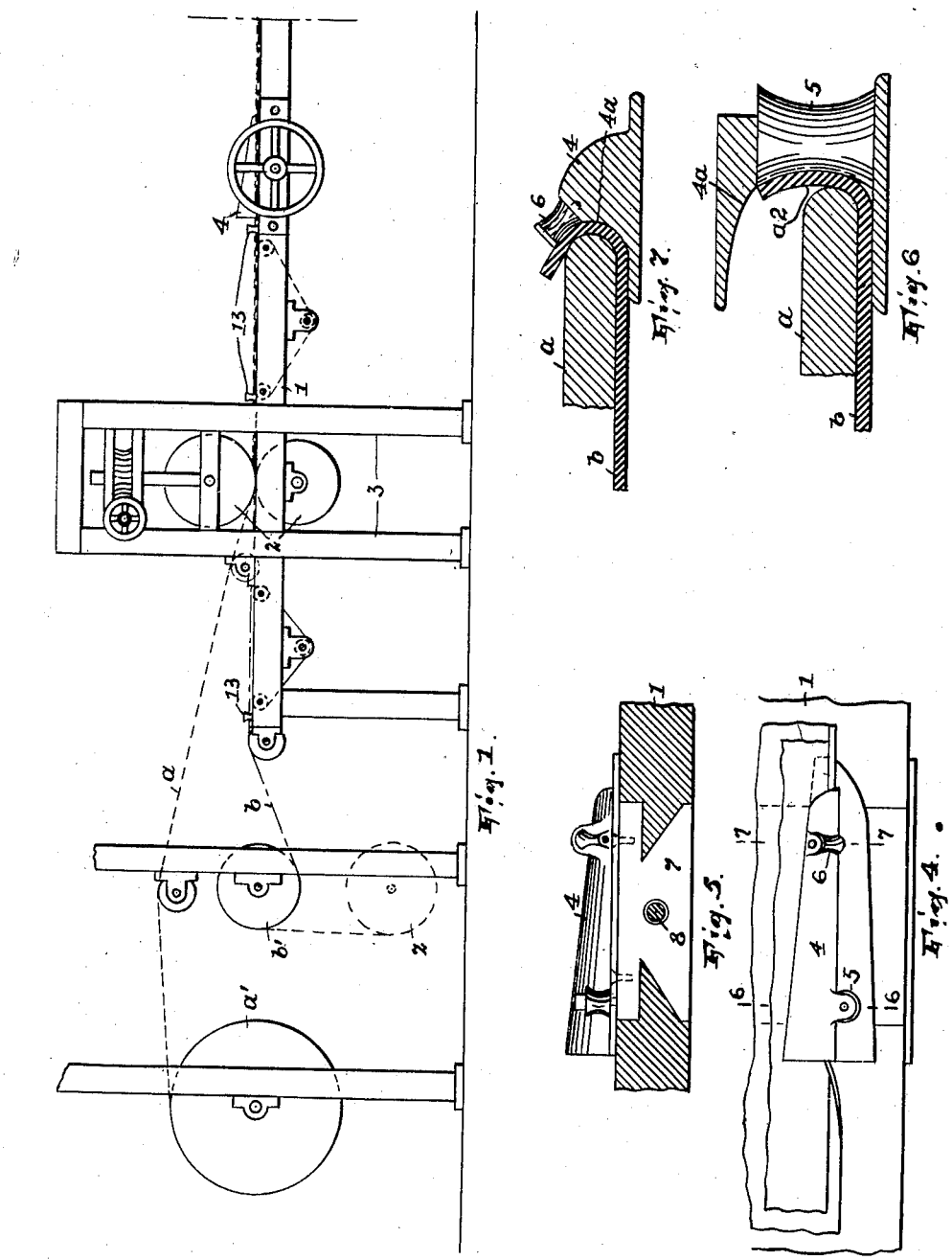

UNITED STATES PATENT OFFICE 2,342,261

ART OF FORMING BELTING

John E. Foerch and Raymond Foerch, Clifton, N. J.

Original application April 15, 1941, Serial No. 388,641. Divided and this application June 30, 1942, Serial No. 449,084

2 Claims. (Cl. 154—4)

This invention relates to the manufacture of belting material and particularly belting material comprising more than one layer component, as conveyor belting material comprising a fabric carcass strip and two uncured rubber covering strips, one to provide the carrying side and the other to provide its pulley side, it being understood that on assembling the said components said material usually undergoes curing. As set forth in our application Serial No. 388,641, filed April 15, 1941 (now Patent No. 2,298,690, dated October 13, 1942), of which this application is a division, the assembling of the three strips is usually performed manually, stated briefly as follows: A part of the length of the carcass strip being laid on a table with a part of the length of the carrying strip on and having its lateral margins projecting beyond the lateral edges of the carcass strip the strips are by hand manipulated to unite them due to the tacky nature of the carrying strip. They are then inverted as a unit and the margins of the carrying strip are by hand bent up and then trimmed away flush with the top face of the carcass. Then a part of the length of the pulley strip is laid on the carcass so as to lap the upturned trimmed edges of the carrying strip and hand-manipulation is again resorted to to cause the tacky pulley strip to adhere to the carcass. Since the belting is usually longer than the table it is necessary to perform the foregoing operations in stages, which involves considerable expense of time and labor. Further, since the manipulation to unite the several components is manually performed there is no positive assurance that the union will be uniform in area or strength, particularly between the bent-off margins of the carrying strip and the edges (usually rounded) of the carcass and between the pulley strip and the trimmed-off edges of said margins.

According to this invention the assembling and uniting and other operations necessary to produce a belt comprising a carcass, a carrying strip covering and adhering to one face of the carcass and having its lateral margins flanking and adhering to the lateral edges of the carcass and trimmed off as indicated above, and a pulley strip covering and adhering to the other face of the carrying strip and the trimmed-off edges of said margins are performed continuously while the mentioned components are undergoing lengthwise advance in unison.

The invention further contemplates certain steps whereby, while advancing given components of belting lengthwise and together, the longitudinal marginal portions of such components together with their broad faces may be uniformly joined in respect to both area and strength, assuming, of course, that one such component presents a tacky or otherwise adhesive surface to the other.

The invention is hereinafter explained by reference to the particular apparatus, as one example, shown in the annexed drawings in which Figs. 1 and 1a, taken together, show the apparatus of our invention in side elevation;

Fig. 2 is a vertical sectional view in the plane 2—2 at the left of Fig. 1a;

Fig. 3 is a longitudinal vertical sectional view of a fragment of the table with certain parts thereon;

Fig. 4 is a plan of a fragment of the table, showing one of the folding devices;

Fig. 5 shows a fragment of the table in vertical longitudinal section and such device in elevation;

Figs. 6 and 7 are transverse sections through said device and the carcass and carrying strip in two stages of the folding operation, said sections being respectively on approximately lines 6—6 and 7—7, Fig. 4;

Fig. 8 shows in transverse section the carrying strip and carcass assembled;

Fig. 9 shows them after the margins of the carrying strip have been bent or folded up and the skiving knives in elevation;

Fig. 10 shows the product of our invention in transverse section; and

Fig. 11 shows in diagram a driving system for the lower rolls 2 and 10.

At $a'$ and $b'$ are wound masses of the carcass strip or carcass $a$ and carrying strip $b$, respectively, the latter being here formed of uncured rubber, or in any other way made to be tacky or adhesive at that broad face thereof which is to be presented to the carcass, and existing wound at $b'$ with some fabric strip to keep its convolutions from adhering together; at $z$ such fabric is to be wound up when strip $b$ is unwound. The strip $b$ is the wider of the strips $a$—$b$.

I is a table and 2 a pair of horizontal compression rolls journaled in uprights 3 with their bight about flush with the top surface of the table. Beyond the rolls relatively to the wound masses $a'$—$b'$ are folding devices or folders each formed as follows: 4 is an elongated part formed with a groove $4a$ conforming generally to the shape of a cone and facing the groove of the other such part, the bottom of each groove being preferably parallel lengthwise of itself with that of the other groove. Near the left-hand or wider end of the groove is journaled in said part, on a vertical axis, a circumferentially grooved roller 5 and near the other end of the groove is journaled in said part on an axis somewhat pitched toward the other folder a circumferentially somewhat smaller grooved roller 6, both rollers having their peripheries protruding slightly into the groove. Each of the mentioned parts is fast to a carrier 7, the two carriers being here adjustable together toward or from each other by a screw 8 journaled in the table and having reversely threaded portions respectively engaged with them. Beyond the folders relatively to the rolls 2 is a pair of disk-shaped knives 9 having their axes vertical and which may be driven in any way and adjusted up or down in any way, how they are driven and how adjusted being not here material. Beyond the knives relatively to the folders a wound mass c' of the uncured rubber pulley strip c is suitably journaled above the table with its axis parallel with the axes of rolls 2, and also beyond the knives relatively to the folders is a pair of calender rolls 10 having their axes parallel with those of rolls 2, their bight being about flush with the top surface of the table. (Any means for adjusting the compression effected by these rolls and rolls 2, being not here material, may be provided.) Strip c is directed around the upper one of rolls 10 and so to their bight. (Fabric wound with strip c in the mass c' may be wound up on a roll y when roll c' is unwound.) 11 is a pair of suitably spaced knives, acting against the periphery of the upper roll 10, for skiving away the marginal portions of strip c.

Preferably at least two of the rolls 2 and 10, one of each pair, are driven in the same direction, or here so as to advance the strips to the right, though in some instances it may suffice to drive only a roll of the pair 10. At any rate, with the strips a and b between the rolls 2 and 10 and with strip c also between the rolls 10, the laminated strip assembly resting on the table and strip b under and strip c above strip a and their longitudinal margins projecting beyond the longitudinal edges of strip a in the initial state of said margins, advance of such assembly to the right will involve the following: The rolls 2, by compressing the strips a and b, will cause their adjoining faces to be united, assuming, as indicated, strip b to present a tacky face to strip a; the folders will bend off the projecting margins of strip b into flanking relation to the edges of the carcass strip and press said margins thereagainst so that they will adhere thereto (assuming, of course, that the folders exist adjusted apart appropriately for these purposes, or spaced preferably more than the width of the carcass but not more than such width plus the combined thicknesses of said bent-off margins); the knives 9 will skive off said margins flush with the upper face of the carcass; the rolls 10, by compression, will cause the adjoining faces of strips c and a to be united, assuming strip c presents a tacky face to strip a; and finally knives 11 will skive away so much of the marginal portions of strip c as project beyond the bent-off margins of strip b.

The method thus involved presents certain important advantages. Thus:

The work proceeds continuously, so that the adhesion between the strips is uniformly distributed and of uniform strength, and the delay incident to inverting the strips from time to time and the possibility of weakening or breaking the bond locally due to the incidental handling are avoided, although so much is in itself not broadly novel in this art. That is to say, it is known to advance lengthwise of themselves a fabric carcass strip and a rubber strip wider than the carcass strip and, during such advance, compress them together and at a later stage in their advance fold the lateral margins of the rubber strip over the lateral margins of the carcass strip so that the rubber strip comes to envelop more or less completely the carcass strip and also during such advance and at a still later stage advance a second rubber strip with the first two strips so that it will face the folded-over margins of the first rubber strip and subject the whole, thus formed, to compression to unite such second rubber strip to said margins of the first strip. But according to our invention, the rubber strips or equivalent, having each at least one adhesive broad face, are to come to exist with such broad faces directly adhering to opposite broad faces of the carcass (that is to say, fabric) strip.

Further, in respect to what is accomplished by compression in the posterior or second zone (by rolls 10), two flat lengthy components, adapted to adhere together to form belting material when they are disposed with broad faces thereof in contact with each other, exist formed; one such component is formed by the already bonded-together strips a and b—the strip b being in covering relation to one broad face, and having its longitudinal margins bent off into flanking relation to the respective longitudinal edges, of the strip a and the edges of such margins substantially flush with the other broad face of strip a—and the other such component is formed by the strip c. With the latter or covering component disposed in covering relation to that face of the first-named component which includes said other face of strip a and said edges of the margins of strip b, the said components are advanced in unison lengthwise of themselves and, during such advance, subjected to compression (by rolls 10) directed through their broad faces and confined to a narrow zone crossing their path of advance and extending clear across the second-named or covering component, whereby not only are the two components bonded together but the margins of the covering component are bonded to said edges of strip b of the first component and the unitary product may proceed to the curing step assuredly devoid of gaps between said margins and edges.

In the present example the first-named component, prior to the procedure last above outlined, has the said margins of strip b which are bent off into flanking relation to said edges of strip a projecting beyond said other broad face of the latter, wherefore such procedure may be regarded as modified by removal, during the advance and other operations of said procedure but anterior in position to rolls 10, of the portions of said margins which project.

Again, given belting material including laminated strips, as a and b, having broad faces thereof adapted to adhere together and arranged with their said faces facing each other and one of which strips, as b, is the more flexible and has its longitudinal margins projecting beyond the respective longitudinal edges of the other strip, the strips are advanced in unison lengthwise thereof and, during such advance, they are subjected to compression directed through their said faces and confined to a narrow zone crossing their path of advance and, also during such advance and posterior in position to said zone, the margins of the first-named strip are bent off (here by the described folders) into flanking relation to the corresponding edges of the other strip and thereupon each such margin, while so more or less bent off, is pressed against the adjacent one, as $a^2$, of such edges, whereby, again, not only are the broad faces of the two strips but also the margins of the first-named strip and the edges of the second-named strip bonded together, and the resulting unitary product may proceed to such ensuing steps as are resorted to in the described example and then to the curing assuredly devoid of gaps between said margins and edges. In such example the pressure is actually exerted while the margins are undergoing the bending-off, or not subsequently thereto, whereby, however, much said margins may be disposed to depart from the bent-off state, they become bound to said edges before they can do so, thus avoiding their becoming bound not in perfectly smooth state, as might otherwise be the case, especially if the second-named strip is relatively quite thin. Actually, further, the pressure is exerted (by the rolls of the folder, offset from each other laterally of the path of advance) progressively toward the free edge of each margin, which further insures the perfectly smooth disposition of the latter in its final or bound state, especially if the edge, as $a^2$, against which it is pressed is rounded, as shown and as usual.

In Fig. 3, 12 is merely an endless belt supported by antifriction rollers 12a to ease the travel of the belting material over the table. 13 are guiding rollers therefor.

Two of the rolls 2—10 are driven, as by gearing 2a—10a, from electric motors 14 in a circuit 15 having a common switch 16 for starting or stopping both motors simultaneously.

Having thus fully described our invention, what we claim is:

1. In the art of assembling in laminated state flat lengthy components adapted to adhere together to form belting material when they are disposed with broad faces thereof in contact with each other and one of which components forms a covering component and the other of which includes a carcass strip and a strip extending lengthwise of and in covering relation to one broad face, and having both its longitudinal margins bent off into flanking relation to the respective longitudinal edges, of the carcass strip and the edges of such margins substantially flush with the other broad face of the carcass strip, the method which consists in disposing the covering component in covering relation to said other face of the carcass strip and said edges of the second-named strip of the other component, advancing said components in unison and lengthwise of themselves and, during such advance, subjecting said components to compression directed through their said faces and confined to a narrow zone crossing the path of advance and extending clear across the second-named component.

2. In the art of assembling in laminated state flat lengthy components adapted to adhere together to form belting material when they are disposed with broad faces thereof in contact with each other and one of which components forms a covering component and the other of which includes a carcass strip and a strip extending lengthwise of and in covering relation to one broad face, and having both its longitudinal margins bent off into flanking relation to the respective longitudinal edges and projecting beyond the other broad face, of the carcass strip, the method which consists in advancing the second-named component lengthwise of itself and, during such advance and within a zone crossing the path thereof, first removing the portions of said margins which project beyond said other face of the carcass strip, then directing the covering component lengthwise of itself and of and in unison with the second-named component and into covering relation to said other face of the carcass strip and the remaining edges of said margins and thereupon, during such advance, subjecting said components to compression directed through said faces and confined to a narrow zone crossing said path and extending clear across the second-named component.

JOHN E. FOERCH.
RAYMOND FOERCH.